United States Patent [19]

Lukacs, III

[11] Patent Number: 5,190,709
[45] Date of Patent: Mar. 2, 1993

[54] REACTION INJECTION MOLDING OF CERAMICS USING A CERAMIC PRECURSOR AS A BINDER

[75] Inventor: Alexander Lukacs, III, Wilmington, Del.

[73] Assignee: Hercules Incorporated, Wilmington, Del.

[21] Appl. No.: 905,484

[22] Filed: Jun. 26, 1992

Related U.S. Application Data

[63] Continuation of Ser. No. 843,776, Feb. 28, 1992, abandoned, which is a continuation of Ser. No. 675,010, Mar. 26, 1991, abandoned, which is a continuation-in-part of Ser. No. 373,305, Jun. 29, 1989, abandoned.

[51] Int. Cl.$^5$ ............................................. C04B 35/64
[52] U.S. Cl. .................................. 264/63; 264/65; 264/328.2; 419/13; 419/14; 419/19; 419/36; 419/39; 419/40
[58] Field of Search ................... 264/63, 328.2, 65; 419/13, 14, 19, 36, 39, 40

[56] References Cited

U.S. PATENT DOCUMENTS

| | | | |
|---|---|---|---|
| 3,719,630 | 3/1973 | Autonen | 260/37 |
| 3,853,567 | 12/1974 | Verbeek | 106/44 |
| 3,892,583 | 7/1975 | Winter et al. | 106/55 |
| 4,117,057 | 9/1978 | Yajima et al. | 264/63 |
| 4,289,720 | 9/1981 | Yajima et al. | 264/63 |
| 4,482,669 | 11/1984 | Seyferth et al. | 524/442 |
| 4,543,344 | 9/1985 | Cannady | 264/63 |
| 4,560,526 | 12/1985 | Okamura | 264/328.2 |
| 4,627,945 | 12/1986 | Winkelbauer | 264/63 |
| 4,650,837 | 3/1987 | Seyferth et al. | 525/478 |
| 4,689,252 | 8/1987 | Lebrun et al. | 427/228 |
| 4,720,532 | 1/1988 | Seyferth et al. | 528/28 |
| 4,722,988 | 2/1988 | Porte et al. | 528/28 |
| 4,761,389 | 8/1988 | Rabe et al. | 501/95 |
| 4,772,494 | 9/1988 | Porte et al. | 427/374.7 |
| 4,845,058 | 7/1989 | Rogers | 264/63 |
| 4,906,424 | 3/1990 | Hughes et al. | 264/63 |
| 4,929,704 | 5/1990 | Schwark | 528/28 |
| 4,939,197 | 7/1990 | Su | 524/300 |
| 5,001,090 | 3/1991 | Schwark | 501/97 |
| 5,021,533 | 6/1991 | Schwark | 528/21 |

FOREIGN PATENT DOCUMENTS 3007384 9/1980 Fed. Rep. of Germany.
63-201058 8/1988 Japan.
WO88/07505 10/1988 PCT Int'l Appl.

*Primary Examiner*—James Derrington
*Attorney, Agent, or Firm*—Joanne W. Patterson

[57] ABSTRACT

A process for reaction injection molding of ceramic articles is disclosed. The process comprises (a) injecting a fluid, non-dilatant mixture comprising a ceramic powder, a metal powder or mixtures thereof, and a curable ceramic precursor that is a liquid below its curing temperature, into a heated mold, (b) curing the ceramic precursor to produce a hardened molded article, (c) heating the hardened molded article under a suitable atmosphere to a temperature sufficient to convert the ceramic precursor to a ceramic, and (d) sintering the ceramic to the desired density.

13 Claims, No Drawings

REACTION INJECTION MOLDING OF CERAMICS USING A CERAMIC PRECURSOR AS A BINDER

This application is a continuation of application Ser. No. 07/843,776 filed Feb. 28, 1992, now abandoned, which is a continuation of Ser. No. 07/675,010 filed Mar. 26, 1991, now abandoned, which is a continuation-in-part of Ser. No. 07/373,305 filed Jun. 29, 1989, now abandoned.

FIELD OF THE INVENTION

This invention relates to a method for reaction injection molding of ceramics.

BACKGROUND OF THE INVENTION

In view of the problems associated with prior techniques such as dry or wet pressing and slip casting, thermoplastic injection molding has been increasingly used to form ceramic articles. Greenbodies prepared in this manner show much improved green strength. The process involves forming a ceramic greenbody by injecting into a mold a mixture of ceramic powder dispersed in a thermoplastic polymer that is held at a temperature above the softening point of the polymer. The mold is held at a temperature below the softening point of the polymer to solidify the mixture of powder and polymer in the mold. A typical ceramic powder/thermoplastic polymer mixture has a very high content of ceramic particles, typically from about 50 to about 87 volume %, and a minimum of the binder material.

The part is then removed from the mold and placed in a furnace to burn out the binder. The molded article is heated very slowly through the decomposition temperature of the polymer, e.g., at 10° C./hour. The very slow heating is required to prevent deformation or "slumping" of the molded article once the furnace temperature exceeds the softening temperature of the polymer. Often, external physical support is needed to prevent slumping during the binder burnout step. Following the binder burnout step, the resulting porous greenbody is sintered, with concurrent shrinkage, to a dense ceramic part with the same shape as the molded object.

The use of an organic thermosetting resin as the binder for the ceramic particles has also been suggested. For example, U.S. Pat. No. 4,627,945 discloses injection molding of compositions that are cured in the mold by the addition of a curing agent to a mixture of ceramic powder and thermosetting phenolic resin binder. Thermoset molding has an advantage over conventional thermoplastic molding in that the greenbody is not prone to "slump" during the sintering process, since the thermoset binder, once cured, no longer has a softening point. The thermoset organic binder must, however, still be completely burned out of the molded article prior to the sintering step.

Reaction injection molding (RIM) has also been adapted for forming shaped ceramic greenbodies. U.S. Pat. No. 4,906,424 discloses a RIM process for molding a mix of ceramic powder and a polymerizable, low viscosity, multifunctional organic acrylate monomer or mixtures of monomers. The ceramic-monomer mixes are formulated to be highly filled, i.e., greater than 50 vol. %, with ceramic powder, yet have adequate fluidity to be processed at ambient temperature and readily injected into a hot mold. Useful monomers are those that are liquid at room temperature and can be polymerized to irreversibly solidify the fluid composition in the mold. The part is then ejected from the mold and subjected to subsequent post-curing, binder removal, sintering and, if needed, machining to produce a dense ceramic part.

However, organic binders such as polyacrylates must be burned out of the molded part in the process of converting the part to a dense, sintered ceramic article. The carbon-containing char that would otherwise remain in the sintered body would have a deleterious effect on the structural integrity and high temperature performance of the sintered part. Often, the carbon in the binders previously disclosed for RIM processes cannot be completely eliminated in the firing step. In addition, removal of an organic binder can cause structural defects in a sintered part due to voids formed from the rapid generation of volatile materials in the binder burnout step. A further complication arises in fabricating sintered parts of well-defined dimensions. Excessive shrinkage occurs when a high fraction of a ceramic greenbody must be removed in a binder burnout step. When the part finally densifies at high temperatures, dimensional distortion can be extreme, requiring a complex mold design.

Binder systems that contribute to the ceramic body ("non-fugitive" binders) have been used in traditional molding methods, although not in RIM processes. For example, U.S. Pat. Nos. 4,689,252; 4,722,988 and 4,772,494 disclose a crosslinkable silazane polymer that can be cured and subsequently pyrolyzed to convert the polysilazane to a ceramic material. The silazane polymer can be used for coating or impregnating a substrate, making ceramic fibers or as a sinterable binder for ceramic powders.

The prior art does not teach a method for (1) rapidly injection molding a high solids, non-dilatant dispersion of ceramic powder in a curable, liquid ceramic precursor at low temperature, i.e., a temperature less than about 120° C., (2) subsequently curing the precursor and (3) sintering the molded article with concomitant conversion of the ceramic precursor binder to a ceramic.

SUMMARY OF THE INVENTION

A method has now been found for reaction injection molding highly-filled mixtures of ceramic and/or metal powders and a ceramic precursor binder. These mixtures can be formed into complex greenbody shapes at temperatures less than about 120° C. by injecting them through a nozzle into a mold, curing, and subsequently sintering to strong, dense ceramic parts with a minimum of shrinkage and mass loss. The improved process of this invention for preparing a sintered ceramic article by low temperature injection of a mixture of a ceramic and/or metal powder and a binder into a heated mold to cure the binder and produce a hardened molded article, and subsequently sintering the article to the desired density comprises (a) injecting into the mold a fluid, non-dilatant mixture comprising a ceramic powder, a metal powder or mixtures thereof, and a binder that is a curable ceramic precursor that is a liquid below its curing temperature, said powder being present in an amount of at least 40% by volume, and (b) prior to sintering, heating the hardened molded article under a suitable atmosphere to a temperature sufficient to convert the cured binder to a ceramic.

DETAILED DESCRIPTION OF THE INVENTION

The ceramic precursor binder used in the process of this invention must exhibit very specific rheological and chemical behavior. The precursor binder must be a liquid at temperatures below its curing temperature and have the properties discussed below in order to be useful in the reaction injection molding process of this invention.

The precursor should preferably cure rapidly by thermal, radical or ionic means. The term "cure" is defined as a chemical polymerization or crosslinking process that leads to thermally irreversible binder solidification to the extent necessary to remove a powder-filled green part from a mold without dimensional distortion. There is an increase in binder molecular weight during curing, with formation of covalent bonds and rapid propagation of bond formation such that the cure is accomplished in less than 60 minutes and preferably less than 10 minutes. Rapid cure mechanisms such as those involving radical propagation are thus preferred.

The ceramic precursor binders preferably have a viscosity of less than 2000 cp, more preferably less than 100 cp, and most preferably between 50 and 1 cp at 25° C. The viscosity of the precursor binder must not increase appreciably over the range of temperatures at which the injection molding is conducted. This is usually not a problem, since molding mixes are injected at relatively low temperatures in a RIM process, i.e., generally less than 80° C. and certainly less than 120° C. This requirement limits suitable precursors to those that do not exhibit appreciable molecular weight increase at temperatures between 25° and about 120° C. However, molecular weight buildup during injection molding is seldom a problem if room temperature viscosities fall within the ranges defined above.

The ceramic precursor binders preferably have a polydispersity less than or equal to three, preferably less than or equal to two. Polydispersity is defined as the ratio of the polymer weight average molecular weight to the polymer number average molecular weight. Polymers or oligomers having a higher polydispersity exhibit complex rheological behavior and often show shear thickening (dilant) behavior when highly filled (greater than 40% by weight) with a ceramic or metal powder. Such polymers, when filled, are therefore unsuitable for injection molding because the mixtures will not flow easily when sheared. In contrast, the highly filled polymers or oligomers of this invention exhibit non-dilatant behavior, even without heating. For example, a mix comprising 77 wt. % (52 vol. %) silicon nitride powder in the poly(methylvinyl)silazane prepared as described in Example 1 has a viscosity of 10,000 poise at a shear rate of 300 sec$^{-1}$ at 25° C. The same molding mix has a viscosity of 6,400 poise at a shear rate of 1000 sec$^{-1}$ at 25° C. The viscosity of such mixes decreases rapidly with modest heating, so that RIM processing of such mixtures can be achieved at temperatures well below 80° C.

After curing, the ceramic precursor should preferably contain no more than 10 wt. %, more preferably no more than 5 wt. %, of species that volatilize below the decomposition temperature of the cured binder. Extensive voids are created if a higher percentage of volatile species is present, leading to unacceptable porosity and increased shrinkage in the fired article.

The ceramic precursor should preferably form a coherent char upon decomposition and at temperatures less than the sintering temperature of the filler.

While monomeric ceramic precursors can satisfy all of the requirements mentioned above, monomers that polymerize to form binder polymers of appreciable ceramic yield (greater than 60 wt. %) often have so low a molecular weight that volatilization at modest molding temperatures becomes a problem. One example is vinyltrimethylsilane, which has a boiling point of only 55° C. Curing this monomer by thermal or radical means to form a solidified binder requires temperatures greater than the boiling point of the monomer. It is thus unsuitable in the RIM process described. Because monomers are generally too volatile to be used in this RIM process, the preferred ceramic precursors of this invention are either oligomeric or polymeric. An oligomer is defined as a polymer molecule consisting of only a few monomer repeat units, i.e., greater than two and generally less than 30. When the precursor used in the practice of this invention is an oligomer or a polymer, the synthesis of the precursor is controlled in order to produce a low molecular weight product that exhibits the requisite rheological characteristics. In general, polymers suitable for the practice of this invention have numbers of repeat units of less than about 200. While it is not the object of this invention to teach the exact synthetic conditions necessary for all families of oligomeric and polymeric precursors suitable for the practice of this invention, in the case of polysilazanes made by ammonolysis of chlorosilanes, control of the synthesis is accomplished by using a low reaction temperature. Alternatively, molecular weights can be kept low by using a more polar solvent when the ammonolysis is performed at higher temperatures. Exact synthetic conditions for preparing suitable precursor oligomers or polymers are dependent on the desired chemical composition of the polymer being prepared and are readily apparent to one skilled in the art.

Suitable precursors for the practice of this invention include, for example, polysilazanes, polyureasilazanes, polythioureasilazanes, polycarbosilanes and polysiloxanes. Suitable precursors of this sort may contain alkenyl, alkynyl, epoxy, acrylate or methacrylate substitution. Specific examples include poly(acryloxypropylmethyl)siloxane, glycidoxypropylmethyldimethylsiloxane copolymer, polyvinylmethylsiloxane, poly(methylvinyl)silazane, 1,3,5-trimethyl-1,3,5-tetramethyl-1,3,5,7-tetravinyltetrasilazane, 1,3,5,7-tetravinyltetramethylcyclotetrasiloxane, tris(vinyldimethylsiloxy)methylsilane, and trivinylmethylsilane.

The ceramic precursor and the ceramic and/or metal powder can be mixed by milling, or they can be mixed without milling. Processing aids such as dispersants, rheology modifiers, sintering aids and lubricants can also be added to the mixture. When curing is to be accomplished by heating, the mixture of ceramic precursor and ceramic and/or metal powder can also include a free radical source, a curing agent or a catalyst, depending upon the type of precursor used.

Any ceramic powder can be used in the process of this invention. Silicon nitride, silicon carbide and alumina are preferred. Suitable metal powders include, for example, silicon, aluminum and the transition metals. The ceramic and/or metal powder comprises at least 40% and preferably at least 50% by volume of the mixture. The percentage be weight will vary, depending on the density of the filler. Although the physical state of the metal and ceramic is referred to as a "powder" throughout this specification, it should be understood that the ceramic or metal can also be present in various other forms such as fibers, whiskers or platelets.

The highly-filled, non-dilatant mixtures of ceramic and/or metal powder are quite fluid at temperatures well below 80° C. and have a pour consistency similar to a thin syrup at temperatures as low as 60° C. at solids loadings of greater than 40 vol. % powder. This contrasts with prior art injection molding mixes that typically have a putty-like consistency during molding.

With regard to the injection molder used in the practice of this invention, a ram extruder is preferred over a reciprocating screw extruder due to the rheological behavior of the mixtures used. The mixture of powder and binder used in the practice of this invention has a sufficiently low viscosity at low temperatures to be extruded through an injection port into a mold at low pressures. In contrast, when reciprocating screw type injectors typically employed for conventional thermoplastic injection molding are used, the material flows up the screw flights rather than out of the nozzle into the mold. The pressure applied to the mix during injection is at least 50 psi and preferably between 100 and 2000 psi. The velocity of the ram is at least 1 inch per second (ips) and preferably between 3 and 10 ips. Excessively fast ram velocities are undesirable due to the jetting of the material into the mold cavity with subsequent formation of knit lines in the greenbody and degradation of the mechanical integrity of the sintered parts. Once filled, the mold pressure is held until the precursor cures. This holding pressure is at least 500 psi and preferably between 1000 and 4000 psi. Higher pressures are desired to minimize part shrinkage and cracking upon removal from the mold. The mold is held at a temperature high enough to initiate polymerization/crosslinking of the precursor. For example, when a dicumyl peroxide initiator is used to crosslink a vinylsilyl group in a precursor binder, the mold temperature is generally set at 150° C. Other initiators require different temperatures. When a free radical initiator is used, a temperature is generally selected so that the hold time in the mold is greater than or equal to one or preferably two half lives of the initiator at that temperature. It is important for the part to cure sufficiently while in the mold so that removal stresses can be sustained without cracking of the molded part. The mold should be fabricated in such a manner that the facile flow of the highly filled precursor mixtures can be accommodated without leaking, since the mixtures are generally highly fluid at temperatures just below their cure temperature. The material used to fabricate the mold should be selected so that there is low adhesion of the cured part to the surface of the mold. This facilitates part removal. The exact nature of the material used to fabricate the mold depends on the composition of the mix to be injection molded and is readily apparent to one skilled in the art.

After curing of the ceramic precursor, the shaped article is heated under a suitable atmosphere to convert the ceramic precursor to a ceramic, and then heated under a suitable atmosphere to a temperature sufficient to densify the article. When high density sintered parts are desired, one or more sintering aids are preferably included in the molding formulation. Such sintering aids are well known in the art and are specific to the material being molded. For example, typical sintering aids for silicon nitride include magnesia, yttria, and alumina. Sintering aids for silicon carbide include boron and carbon. The densified articles retain their net shape after firing. The term densify is meant to include solid phase sintering, liquid phase sintering and reaction bonding.

The atmosphere selected for each of these steps may be the same or different, and depends upon the type of ceramic that is desired in the final product. For example, if a silicon nitride product is desired, a polysilazane can be pyrolyzed under an ammonia atmosphere to maximize the ceramic yield of silicon nitride and then sintered under a nitrogen atmosphere, which is less expensive and less dangerous to use than ammonia at high sintering temperatures. Alternatively, a silicon carbide product can be obtained by using a polysilazane ceramic precursor and treating under an argon atmosphere for both steps. As a further example, a silicon dioxide product can be obtained by using a polysilazane ceramic precursor and treating under an atmosphere of air or oxygen in both steps. A silicon nitride product can also be obtained from a mixture of silicon metal and a polysilazane or polyureasilazane ceramic precursor by pyrolyzing the polymer in ammonia, and then nitriding the silicon metal and densifying the material in an atmosphere comprising a mixture of hydrogen, helium and nitrogen.

EXAMPLE 1

Poly(methylvinyl)silazane is prepared as follows. A 5 liter, three-necked flask is equipped with an overhead mechanical stirrer, a dry ice/acetone condenser ($-78°$ C.), an ammonia/nitrogen inlet tube and a thermometer. The apparatus is sparged with nitrogen and then charged with hexane (1760 ml, dried over 4 A molecular sieves), methyldichlorosilane (209 ml, 230.9 g, 2.0 mol) and vinylmethyldichlorosilane (64 ml, 69.6 g, 0.5 mol). The ammonia is added at a rate of 3.5 l/min (9.37 mol) for one hour. During the addition, the temperature of the reaction rises from 25° to 69° C. After one hour, the ammonia flow is stopped and the reaction mixture cooled to room temperature. The reaction mixture is filtered on a glass-fritted funnel to remove the precipitated ammonium chloride. The hexane is removed from the filtrate under reduced pressure (28 mm Hg, 60° C.) to give $[(CH_3SiHNH)_{0.8}(CH_3SiCH=CH_2NH)_{0.2}]_n$ as a clear oil (150.76 g, 2.34 mol, 94% yield). The oil has a viscosity of 43 cp at 25° C. and a molecular weight of 560 g/mol.

A mixture of 80 g silicon powder, 25 g poly(methylvinyl)silazane, 0.15 g dicumyl peroxide and 100 ml 1,1,1-trichloroethane is mixed in a jacketed resin kettle with a stirring blade. The solvent is stripped off under vacuum using steam heat. The blend is injection molded at 50° C. into a steel die and cured at a die temperature of 150° C. using 800 psi of pressure on the injection ram. After removal from the die, the part can be forcibly thrown against a concrete floor with no visible damage. The parts are heated at 55° C. per hour up to 1000° C. and then at 100° C. per hour up to 1350° C. in a mixed nitrogen-hydrogen atmosphere to convert both the poly(methylvinyl)silazane and the silicon metal powder to silicon nitride and densify the material. The net shape of the article is retained after densification.

EXAMPLE 2

A mixture of 454 g silicon nitride powder, 23 g alumina powder, 23 g yttria powder, 5 g of the poly(methylvinyl)silazane prepared as described in Example 1 and 600 ml 1,1,1-trichloroethane is milled in a vibratory mill using a silicon nitride grinding medium. The mixture is stripped of solvent. A portion of the mix (380 g) is blended with 145 g poly(methylvinyl)silazane, 1 g dicumyl peroxide, 1.0 g glycerol monooleate, and 250 ml 1,1,1-trichloroethane. The solvent is stripped and the blend is injection molded at 50° C. using a Jaco Model III-V screw feed injection molder and cured at a die temperature of 150° C. using 600 psi on the ram. The cured parts are heated at 55° C. per hour up to 1000° C. to convert the binder to a silicon nitride ceramic, and then at 100° C. per hour up to 1600° C. in a nitrogen atmosphere to convert the poly(methylvinyl)silazane to silicon nitride and densify the material. The net shape of the article is retained after densification.

EXAMPLE 3

Silicon powder (52 g) is mixed with 30 g silicon nitride. A portion of this mixture (78 g) is blended with 30 g of the poly(methylvinyl)silazane prepared as described in Example 1, 0.2 g dicumyl peroxide, and 100 ml 1,1,1-trichloroethane. After stripping off the solvent, the blend is injection molded at ambient temperature using a Jaco Model III-V screw feed injection molder and cured using 800 psi of pressure on the ram and a die temperature of 150° C. A tough, strong green body is obtained.

EXAMPLE 4

A mixture of 1540 g of UBE SN-ESP silicon nitride powder, 440 g of poly(methylvinyl)silazane prepared as in Example 1, 18.0 g of dicumyl peroxide, and 2.0 g MAZOL 300 K glycerol monooleate dispersant (PPG/Mazer Chemicals) is prepared using a Ross Model A6C17XC20C planetery mixer. The blend is injection molded using a Hull Model 120-25 injection molder at a ram speed of 4.0 inches per second and a pressure of 500 psi at a temperature of 50° C. into a steel die. The molded part is cured in the die under a pressure of 2000 psi at a temperature of 150° C. for 30 minutes and then removed from the die, resulting in a strong part having a smooth surface finish.

EXAMPLE 5

A polyureasilazane is prepared as follows. A 500 ml one-necked flask is equipped with a stir bar and septum and sparged with nitrogen. The flask is then charged with 324.46 g of the poly(methylvinyl)silazane prepared as described in Example 1, and 1.48 ml (1.62 g) of phenylisocyanate by syringe to give 0.5% phenylisocyanate in the polysilazane. The mixture is opaque and has a pearlescent appearance. The flask is then equipped with a reflux condenser with a nitrogen inlet at the top.

The reaction mixture is heated to 90° C. in an oil bath. At 79° C. the reaction mixture loses its pearlescent appearance and becomes clear. The reaction mixture is heated at 90° C. for two hours and then cooled at room temperature. Polyureasilazanes prepared using this procedure typically have a room temperature (25° C.) viscosity of 50 to 60 centipoise.

An injection molding mix is made by mixing 766.4 g of beta-silicon carbide, 276.6 g of polyureasilazane, 1.04 g of MAZOL 300K dispersant (PPG/Mazer Chemicals), and 1.11 g of dicumyl peroxide in a Ross Model A6C17XC20C planetary mixer. The mix is injection molded at 50° C. on a Hull Model 120-25 injection molder at a ram speed of 4.0 inches per second under 500 psi pressure. The part is cured in the die at a temperature of 150° C. for a period of 30 minutes. The cured part is strong, and has a good surface finish.

EXAMPLE 6

The rheological behavior of the mixtures of this invention is measured by the following technique. About 20 g of the polysilazane/silicon nitride mix prepared as in Example 4 is loaded into a Gottfert High Pressure Capillary Rheometer (Rheograph 2002). A 2 mm diameter, 20 mm long die is used to extrude the mixture at 25° C. The rheological data obtained indicates shear thinning behavior as the shear rate is increased within the range of about 300 $sec^{-1}$ to a shear value of about 2500 $sec^{-1}$. The viscosity measured at 300 $sec^{-1}$ is approximately 10,000 poise, while the viscosity at 2500 $sec^{-1}$ is approximately 3,200 poise.

I claim:

1. A process for preparing a sintered ceramic article comprising:
   (a) injecting into a heated mold a fluid, solvent-free, non-dilatant mixture comprising at least 40% by volume of a ceramic powder, a metal powder or mixtures thereof, and a curable poly(thio)ureasilazane binder that is a liquid below its curing temperature, to cure the binder and produce a hardened molded article,
   (b) heating the hardened molded article under a suitable atmosphere to a temperature sufficient to convert the cured binder to a ceramic and
   (c) sintering the article to the desired density.

2. The process of claim 1 wherein the mixture in (a) also comprises a free radical source and the poly(thio)ureasilazane is cured by heating.

3. The process of claim 2 wherein the free radical source is an organic peroxide.

4. The process of claim 1 wherein the mixture in (a) also comprises a sintering aid.

5. The process of claim 1 wherein the powder is silicon metal.

6. The process of claim 1 wherein the ceramic powder is silicon carbide.

7. The process of claim 1 wherein the poly(thio)ureasilazane has a viscosity of less than about 2000 cp.

8. The process of claim 7 wherein the poly(thio)ureasilazane has a viscosity of less than about 100 cp.

9. The process of claim 1 wherein the injection temperature is less than about 120° C.

10. The process of claim 9 wherein the injection temperature is less than about 60° C.

11. The process of claim 1 wherein the injection pressure is between 50 psi and 2000 psi.

12. The process of claim 11 wherein the injection pressure is between 100 psi and 2000 psi.

13. The process of claim 1 wherein the sintered ceramic is a silicon nitride-containing ceramic.

* * * * *